April 12, 1960     H. B. GULBRANDSEN     2,932,541

SLIDE

Filed Sept. 30, 1958     2 Sheets-Sheet 1

Herbert B. Gulbrandsen
INVENTOR.

BY

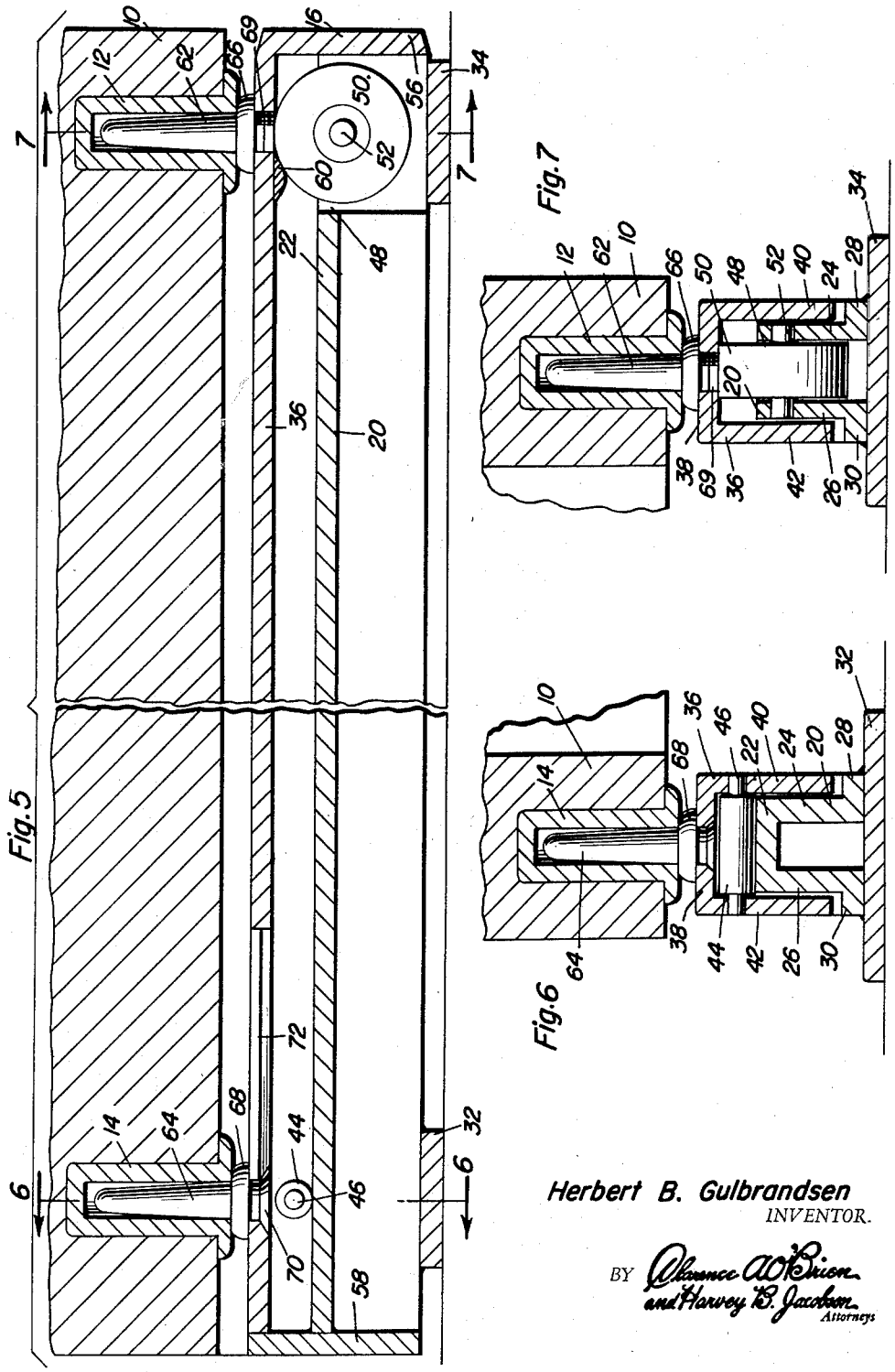

United States Patent Office 2,932,541
Patented Apr. 12, 1960

2,932,541

SLIDE

Herbert B. Gulbrandsen, Glasgow, Mont.

Application September 30, 1958, Serial No. 764,328

2 Claims. (Cl. 308—6)

This invention relates to an attachment for heavy objects, for instance, beds, stoves, refrigerators and other objects which are comparatively heavy but which should be moved periodically, in order to facilitate the movement of such objects.

An object of the invention is to provide a slide which is comparatively inexpensive and which will prevent floor surfaces from becoming scarred or otherwise damaged when moving an object thereon.

The invention is embodied in a slide which has a pair of movable rails slidably connected with each other. One of the rails is adapted to remain stationary on the supporting surface, for instance a floor, while the other slide moves with respect to the stationary slide. The movable slide has the article of furniture, appliance or other object connected with it to thereby facilitate the handling of the object.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5 is an enlarged sectional view showing one of the slides and a fragment of the bed thereon.

Figure 6 is a sectional view taken on the line 6—6 of Figure 5.

Figure 7 is a sectional view taken on the line 7—7 of Figure 5.

Figure 1:
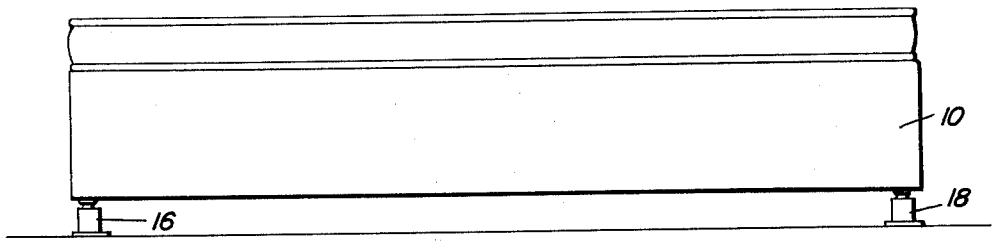
Figure 1 is a front view of a bed located on a pair of slides in accordance with this invention.
Figure 2:
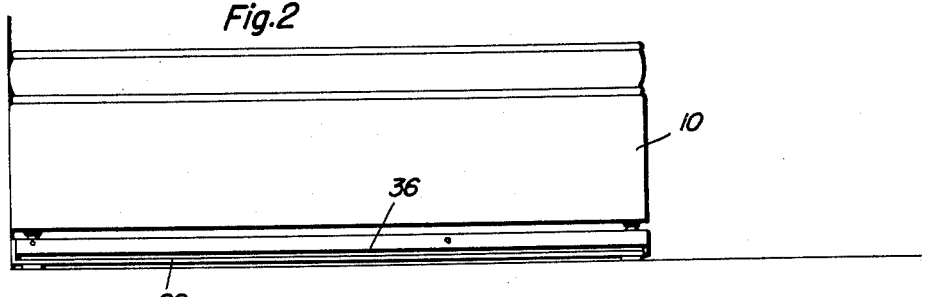
Figure 2 is a side view of the bed in Figure 1.
Figure 3:
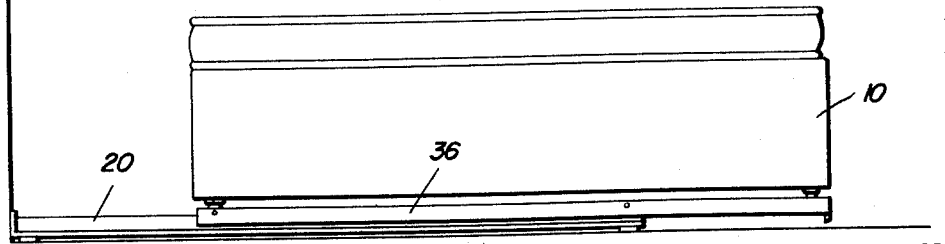
Figure 3 is a side view of the bed in Figure 1 but showing the bed in the extended position.
Figure 4:
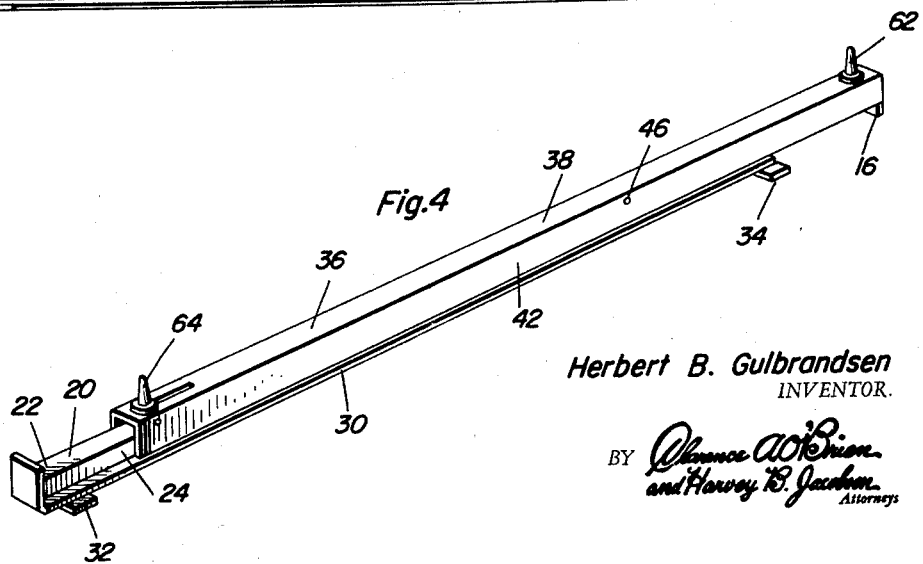
Figure 4 is a perspective view of the slide made in accordance with the invention.

In the accompanying drawings there is a bed 10 which merely schematically represents any comparatively heavy article which must or should be moved occasionally for a number of purposes, one of which is to clean behind and/or under it. Although the subsequent description relates to the bed 10, it is to be clearly understood that the principles of the invention are applicable with many other objects, only a few of which were listed herein previously.

Bed 10 has a pair of sockets 12 and 14 at one side thereof and an identical pair of sockets at the other side thereof. These sockets would ordinarily accommodate casters. In the practice of the invention the casters are either removed or never inserted, depending on whether the slide is to be used as original equipment or as an attachment for existing beds. In either case, the four sockets are preferred. There are two slides 16 and 18 at the ends of the bed 10, each being identical. Therefore, only the slide 16 is shown in detail.

Slide 16 is made of a comparatively stationary rail 20 which is preferably U-shaped, having a flat top member 22 and two sides 24 and 26 and forms a downwardly opening channel rail. The lower ends of the sides have short lateral flanges 28 and 30 to which transverse plates 32 and 34 are welded or otherwise secured. These plates function as feet and may be covered with rubber or some other soft substance. They are supporting surface contacting members and once rested on a supporting surface, they remain in place.

Movable rail 36 is also U-shaped and forms a downwardly opening channel rail having an upper member 38 and two sides 40 and 42 integral with the upper member. Sides 40 and 42 are disposed in parallel relationship and on the outside of sides 24 and 26. Member 38 is parallel to member 22 and is vertically spaced therefrom. As will be seen, movable rail 36 straddles the stationary rail 20 and is spaced from and clear of the sides 24, 26 and flanges 28, 30.

Roller 44 has a spindle 46 mounted for rotation in aligned bearing openings in sides 40 and 42. Therefore, the roller is carried horizontally by the movable rail transversely of said rails 20, 36 and is in contact with the upper member 22 of the stationary rail. This establishes a rolling contact between the rails near the rear ends thereof.

The front part of member 22 has a notch 48 in it (Figs. 5 and 7) in which a vertical wheel 50 is mounted for rotation. The spindle 52 extends through a central opening in wheel 50 and is mounted for rotation about an axis transverse to said rails 20, 36 in aligned bearing openings in sides 24 and 26 of the stationary rail. The diameter of wheel 50 is sufficiently large so that the front part of member 38 rests on its perpihery thereby coacting with roller 44 to establish a rolling support for the movable rail.

A downturned plate 56 is attached to member 38 at its forward end and establishes a finished appearance for the slide. An upstanding plate 58 welded or otherwise secured to member 22 of the stationary rail, constitutes an abutment or stop for the rear end of the movable rail. Therefore, when the movable rail is slid rearwardly to its nested relationship with the stationary rail, the rear edge of member 22 strikes the abutment formed by plate 58 to limit the extent of relative movement between the rails in one direction. By having wheel 50 carried by the stationary rail, the front part of the movable rail is free to oscillate a short distance about the longitudinal axis of rotation of roller 44. Therefore, the front part of rail 36 may be elevated so that abutment 60 on the lower surface of member 38, may ride over the wheel 50. When on the inner side of wheel 50, abutment 60 constitutes a stop for the upper rail. However, to slide the upper movable rail with respect to the lower stationary rail, the abutment 60 rides over the periphery of wheel 50, and the movable rail 36 may travel a substantial distance on the stationary rail.

There are means for coupling bed 10 to the movable rail 36. These means consists of a pair of pins 62 and 64 having collars 66 and 68 intermediate their ends. Pin 62 has a threaded shank 69 below collar 66 and is threaded in an opening of the member 38 of the movable rail. The pin 64 has its collar in contact with member 38 and a head 70 below collar 68 and engaged in slot 72 in the member 38 of rail 36. Therefore, pin 64 is capable of sliding the full length of slot 72 in order to adjust the spacing of pins 62 and 64 to accommodate different sizes, manufacturer's makes, styles, etc. of beds, appliances and the like.

The foregoing is considered as illustrative only of the principles of the invention. Further, since numerous modifications and changes will readily occur to those

What is claimed as new is as follows:

1. A slide for moving a heavy article comprising a stationary rail having a top and sides and a notch at one end in said top, transverse bottom plates on said stationary rail for resting on a floor to support the stationary rail, a downwardly opening movable channel rail straddling said stationary rail clear of said sides and plates and having a top, a transverse horizontal roller in one end of the movable rail having rolling engagement with the top of the stationary rail, a vertical wheel journaled in said stationary rail and extending upwardly out of said notch in frictional engagement with the top of the movable rail, said roller and wheel supporting said movable rail for longitudinal movement from a normal position on said stationary rail for moving an article overlying the movable rail, and an abutment depending from the top of the movable rail and engaging said wheel to establish the normal position of said movable rail, said movable rail being vertically tiltable on said roller to permit said abutment to ride over said wheel and provide for longitudinal movement of the movable rail from normal position.

2. A slide according to claim 1, the top of the movable rail having a longitudinal slot therein, and a pin rising through said slot and adjustable along said slot into different set positions for attachment in different positions to an article overlying the movable rail.

References Cited in the file of this patent

UNITED STATES PATENTS

| | | |
|---|---|---|
| 687,838 | Keiper | Dec. 3, 1901 |
| 1,820,548 | Walter | Aug. 25, 1931 |
| 2,692,802 | Kurtzon | Oct. 26, 1954 |
| 2,822,232 | Lhota | Feb. 4, 1958 |
| 2,873,150 | Hutzelman | Feb. 10, 1959 |